United States Patent [19]
Autant et al.

[11] Patent Number: 5,441,742
[45] Date of Patent: Aug. 15, 1995

[54] CELLULAR CELLULOSIC MATERIAL CONTAINING A BIOCIDE AGENT AND PROCESS FOR PREPARING SAME

[75] Inventors: Pierre Autant, Commentry; Christophe Chalvin, Beauvais; Claudine Colin, St. Etienne; Rafaël Jorda, Ste.Foy-les-Lyon; Jean-Luc Wertz, Beauvais, all of France

[73] Assignee: Financiere Elysees Balzac, Paris, France

[21] Appl. No.: 210,455

[22] Filed: Mar. 21, 1994

[30] Foreign Application Priority Data

Mar. 24, 1993 [FR] France ................... 93 03377

[51] Int. Cl.⁶ .................. A61K 9/14; A61K 9/50; A01N 25/00; A01N 25/34
[52] U.S. Cl. ................... 424/405; 424/409; 424/410; 424/413; 424/488; 424/490; 424/502; 514/762; 514/951; 514/964; 514/965
[58] Field of Search ............. 424/405, 409, 410, 413, 424/488, 490, 502; 514/762, 951, 964, 965

[56] References Cited

FOREIGN PATENT DOCUMENTS 0314340 5/1989 European Pat. Off. .

OTHER PUBLICATIONS

Nitikin, Academy of Sciences of the USSR, "The Chemistry of Cellulose and Wood", Israel Program for Scientific Translations, Jerusalem, 1966, pp. 62–71.

*Primary Examiner*—Nathan M. Nutter
*Attorney, Agent, or Firm*—Bacon & Thomas

[57] ABSTRACT

The present invention relates to a cellular cellulosic material containing a biocide agent and to a process for preparing same. Characteristically, matrix type microparticles, containing at least one biocide agent, are distributed in the network of cellulose of said material, ensuring therein, in the presence of moisture or water, a controlled release of the biocide agent or agents.

19 Claims, No Drawings

CELLULAR CELLULOSIC MATERIAL CONTAINING A BIOCIDE AGENT AND PROCESS FOR PREPARING SAME

The present invention relates to a cellular cellulosic material containing a biocide agent and to a process for producing same.

This invention covers the field of sponges, spongecloths, foamed sponges and similar products for use in domestic cleaning and maintenance works or personal hygiene, and proposes an improvement in the resistance of said products against attacks from micro-organisms.

According to the invention, the protecting agent (or biocide(s)) is introduced at some stage in the process for producing the cellulosic product, in the form of matrix particles; the matrix in said particles having a double function which is:

to protect the active agent when this is introduced into the cellulosic product during the production process and during the final phases of production (and to protect the preparation medium from said active agent);

to control the active agent releasing speed during use of the product.

Various methods have already been proposed in the prior art, for protecting cellulosic products or domestic cleaning tools against attacks from micro-organisms, and among these:

the introduction, during the production of the product, of a biocide agent in the reactive mixture. This method, which is described, for example, in patent U.S. Pat. No. 4 476 251, is especially adapted to synthetic foams such as polyurethane foams, obtained by crosslinking of a mixture of different polymers. On the other hand, it cannot be adapted to the production of cellular cellulosic products insofar as the active agent, which is not protected, would then be irreparably affected or lost during the cellulose regeneration step, which step is especially aggressive. The process for producing said cellular cellulose products, known as viscose process, and described in particular in patent FR-A-812 502 includes the steps of preparing a paste-like mass notably from a cellulosic solution, such as viscose, from fibrous materials, pigments and expanding agents; shaping such a mass in particular by molding or by coating on either side or on one side of a grid or by deposition on a conveyor belt; heating same optionally in an adequate medium so that the action of the expanding agents is exerted, and the cellulose is regenerated. This last step is a particularly aggressive one. It can be performed either by passing an a.c. current between electrodes in contact with the pulp, or by placing the pulp in contact with an acid medium (of pH near 0), at temperatures around 70° C. for a few minutes (so-called acid regeneration for making sponge-cloths), or by placing said pulp in contact with a basic medium (of pH near 12), at temperatures around 100° C. for a few hours (so-called basic regeneration for making sponges). Whatever the embodiment used, said step in the process for producing cellular cellulosic products excludes the introduction of the unprotected active agent;

the introduction, during the production of the product, of a polymer adapted to fix a biocide agent, said biocide agent being itself introduced at the end of the production process. Said method, which is particularly described in patent application WO 85/02422, is adapted to the products in regenerated cellulose. Nevertheless, with said method, the active agent has to be iodine, which for example, implies a coloring which is incompatible with the currently proposed application;

the introduction, after the production of the cellulosic product, of a biocide agent. Said agent is fixed in the cellulose network, either by precipitation—as illustrated in patent U.S. Pat. No. 3,018,192, FR-A-1 200 663 and FR-A-1 345 614—or by a latex—as illustrated in patents U.S. Pat. No. 2,257,911—or by a technique combining precipitation and binding—as illustrated in application EP-A-0 358 572—. The different variants of said method are adapted to the cellular cellulosic products. However, they impose, for those which are based on precipitation, the use of biocides liable to have an ionic charge, and for all of them, post-treatments which may be expensive;

the introduction of an active agent or of a system for controlling the release of an active agent between the different parts constituting the final product: in a cavity—as illustrated in application EP-A-0 314 340—at the level of an adhesive seal—as illustrated in application EP-A-0 500 460—. This method is only applicable to combined products and to pads. It will also be noted that, it is difficult, with the method described in application EP-A-0 314 340, to ensure a release of the active ingredient which is adapted to the needs, seeing that said active ingredient is released under the pressure applied by the user.

An original method is currently proposed, also for the purpose of protecting cellular cellulosic materials against micro-organisms.

The cellular cellulosic materials according to the invention contain in their cellulose network, particles of matrix type which contain at least one biocide agent and which are capable, in the presence of moisture or water, to controllable release said biocide agent or agents.

Characteristically, microparticles, trapped in the cellulose network, are found in the cellular cellulosic materials according to the invention.

Said microparticles are of matrix type and not of the reservoir type; They contain at least one biocide within a matrix.

The first function of said matrix is to protect said biocide or biocides during the incorporation of the microparticles into the cellular cellulosic material being produced, and during the final production phases of said material. Said microparticles have to be introduced before the cellulose regeneration phase in order to be distributed out into, the cellulose network of the finished product.

The second function of said matrix is to allow, while in contact with moisture or water, a controlled release of said biocide or biocides. Such release is controlled and programmed as regards the quantity of biocide released in time. Such quantity is optimized in order to ensure the protection of the cellular cellulosic material from micro-organisms throughout its period of use.

Said matrix must be capable of both withstanding severe physico-chemical conditions (cellulose regeneration conditions, during which the cellulose xanthate solution (viscose) is converted into non-soluble cellulose: severe conditions such as defined above), and releasing, in smooth conditions (conditions of use of the cellular cellulosic material), and in a controlled way, the biocide or biocides that it contains.

The microparticles trapped in the cellulose network of the cellular cellulosic materials according to the invention, are generally in sphere form, the diameter of the spheres ranging between 0.05 and 2 mm, preferably between 0.1 and 1 min. The granulometry of said microparticles is an important parameter which influences the release-kinetics of the active ingredient.

Said microparticles can also be in other forms, resulting from the production process, for example, flake form.

Their action, as indicated hereinabove, is to ensure the protection of the cellular cellulosic material during its period of use in conditions which are always more or less humid or in the presence of more or less important quantities of water.

Generally, said material contains between 0.1 and 10% by weight thereof, with respect to the weight of dry cellulose. Advantageously, it contains between 0.5 and 2% by weight thereof, with respect to the weight of dry cellulose. It is most important that the final characteristics of the cellulosic material (capacity of absorption, mechanical strength, . . . ) are not altered during the introduction of said microparticles into its structure.

The constituents of said microparticles (active ingredient or ingredients and matrix constituent or constituents) are selected so that said microparticles can ensure their double function of protection of the biocide and of its release, such as defined hereinabove.

Advantageously, said biocide agent or agents are compounds which have a solubility in water at room temperature less than 500 mg/l and which are active in low concentration, and the matrix within which said biocide agent or agents are dispersed contains one or more fusible hydrophobic constituents, selected so as to confer to said microparticles low response to pH and to organic solvents as well as a stability up to temperatures of between 95° and 120° C. and to allow the controlled release of said biocide agent or agents in a humid medium.

More precisely, the biocide agent or agents used are advantageously:
only slightly soluble in water: the poor solubility of the active ingredient makes it possible to introduce it in the particle system in proportions that are higher than the percolation rate, and to reduce the quantity of particle system to be introduced,
active in low concentrations: obviously, in practice, there is a restriction as to the quantity of active ingredient which should be introduced in the cellulosic material, i.e. as to the quantity of microparticles to be introduced therein. Advantageously, the biocides used are active at concentrations of about 0.1% by weight with respect to the weight of dry cellulose.

Advantageously, the biocide agent or agents used are compounds which are solid at room temperature. However, it is quite possible to use biocide agents which are liquid at room temperature.

It is further specified that, advantageously, the biocide agent or agents used have a thermal resistance which is compatible with the conditions of incorporation of the microparticles into the material being produced. Whatever the case, the microparticles (matrix biocide or biocides in one or more meltable hydrophobic constituents) must be stable at temperatures of between 95° and 120° C.

From the indications given hereinabove, the man skilled in the art is capable of selecting active ingredients—biocides—which are suitable according to the invention.

Examples of suitable biocides are:
2-(1,3-thiazol-4-yl)benzimidazole (or thiabendazole),
methylbenzimidazol-2-yl carbamate (or carbendazim),
2,2'-dihydroxy-5,5'-dichlorodiphenylmethane (or dichlorophene),
2,4,4'-trichloro-2'-hydroxybiphenylether (or triclosan),
1-[[2-(2,4-dichlorophenyl)-1,3-dioxalan-2-yl]methyl]-1H-1,2,4-triazole (or azaconazole), and
mixtures thereof.

This list is not in any way restrictive.

More specifically, the matrix inside which said biocide agent or agents are dispersed contains one or more meltable hydrophobic constituents. The hydrophoby required from said materials is easy to understand. Their meltability is necessary to enable the production of the microparticles at reasonable temperatures. Advantageously, the selected materials have a melting point which is below or equal to 150° C. Said melting point should however by higher than the temperatures which said microparticles are required to be able to withstand. It is also advantageously comprised between 120° and 150° C.

As indicated hereinabove, said matrix should, insofar as possible, isolate and protect the active ingredient from the medium into which it is introduced for its incorporation during the production of the cellulosic material (and likewise isolate and protect said medium from said active ingredient) while authorizing a controlled release in a wet medium or in the presence of water. The constituents of said matrix should be selected so as to confer to the microparticles:
a relative inertia towards the pHs of the mediums in which the cellular cellulosic materials are produced—which pHs can, depending on the regeneration process used, have values as different as 0–1 (acid regeneration) or 11–13 (basic regeneration)—and towards any organic solvents that they may contain—mostly carbon sulfide ($CS_2$)—;
a thermal stability, up to temperatures of around 95°–120° C.

Advantageously, said matrix has a melting point higher than 95° C.; a resistance to pH 14° at 60° C. for at least 15 minutes; a resistance to pH 1 at 70° C. for at least 15 minutes; a resistance to the action of carbon disulfide for at least 15 minutes; the resistance being defined as the limitation of the release in the testing medium of the biocide or biocides, in a proportion not exceeding 50% by weight, and preferably 15% by weight of the initial quantity of biocide present.

From the indications given in the foregoing, the man skilled in the art can select the basic constituent or constituents of said matrix.

Advantageously, said basic constituents have a melting point higher than 100° C. and are selected among:
microcrystalline waxes;
straight chain saturated hydrocarbons of molecular weight ranging between 500 and 3,000;
polyethylene waxes, of molecular weight ranging between 500 and 3,000;

straight chain fatty acid amides and in particular stearamide;

ethylene bistearamide; and mixtures thereof.

Besides said basic constituents and the biocide agent or agents that the matrix contains, said latter can also include one or more additives of the type of compatibilizing agent, plasticizing agent, surfactants, etc. ... It can also include, according to a variant of the invention, one or more coloring agents or other additives which could alter the appearance of the microparticles.

Advantageously included in the matrix, in order to increase its hydrophily, is at least one lipophilic nonionic surfactant which is optionally polyoxyethylenated: i.e. having between 0 and 40 moieties of ethylene oxide per molecule. Such surfactants can be used in the proportion of up to 30% by weight of the microparticles of the invention. According to a preferred variant, they are used in a proportion of up to 15% by weight. Advantageously, they consist in polyoxyethylenated fatty alcohols having a straight chain of carbon atoms including 10 to 100 carbon atoms and 2 to 40 moieties of ethylene oxide per molecule.

It is possible, by using more than one of said surfactants, to obtain an effect of synergy on the expected result.

In particular, such a modification of the composition of the matrix influences the kinetics of the release of the biocide or biocides contained in said matrix.

A surfactant of the abovementioned type or a mixture of such surfactants is advantageously used in combination with at least one straight chain saturated hydrocarbon for producing microparticles usable according to the invention.

Said microparticles generally contain between 5 and 70% by weight, and advantageously between 15 and 50% by weight, of active ingredient (or biocide(s)), therewithin.

They are prepared by conventionally known techniques, used with the active ingredients and constituents suitable for the matrix. Such techniques can for example consist in:

the methods of dispersion in liquid medium, also known as "meltable dispersions" or "hot melt", whereby the molten mixture or the dispersion of the active ingredient in the molten matrix is dispersed in a non-solvent liquid medium at a temperature higher than the solidification temperature of the system. The suspension is then cooled until solidification of the product;

hot extrusion followed by granulation, according to the conventional technique of production of plastic material compounds;

the spraying or prilling methods whereby the molten mixture or the dispersion of the active ingredient in the molten matrix is put in the form of droplets of required granulometry, by spraying through an optionally vibrated nozzle. The droplets are then subjected to a spontaneous or forced cooling, so that they solidify while dropping;

the "flaking" method, whereby a cooled cylinder is partly immersed in a bath containing the molten mixture or dispersion. The rotating movement of the cylinder enables the recovery in the cold zone of a film of solidified mixture, which is granulated by coarse grinding and screening.

All of said methods enable the preparation of matrix type microparticles.

Incidently, it will be noted at this stage that the matrix type microparticles, such as abovedescribed (from page 4, line 3 onwards) are novel products per se. Their development—choice of constituents—was not an obvious matter.

The second object of the invention is to provide a process for preparing cellular cellulosic materials containing within their network of cellulose, matrix type particles, capable, when in the presence of moisture or water, of releasing in controlled manner, at least one biocide agent which acts within said cellular cellulosic materials.

Said process repeats the steps of the viscose method, such as indicated hereinabove, namely:

preparation of a pulp notably from a cellulosic solution, such as viscose, fibrous materials, pigments and porophorous agents;

shaping of said pulp in particular by molding, by coating both sides or only one side of a grid therewith or by deposition on a conveyor belt;

the heating thereof, optionally in a suitable medium, so that said porophorous agents can exert their action, and so as to cause regeneration of the cellulose.

It is specified at this stage that the viscose—cellulosic solution—is obtained by the action of an alkaline solution which transforms the basic wood pulp into alkalicellulose, which latter reacts with carbon sulfide in order to form a cellulose xanthogenate which is soluble in alkaline solutions. A viscose solution is thus obtained to which are particularly added fibrous materials (such as cotton or flax) in order to increase the resistance of the finished cellulosic product.

The cellulose is regenerated from viscose in the strict conditions indicated hereinabove.

The products obtained after regeneration of the cellulose are conventionally rinsed, if necessary bleached, dried, plasticized before being cut and packed.

In characteristic manner, the process for preparing cellular cellulosic materials according to the invention consists in introducing into the pulp (viscose+fibrous materials+pigments+porophorous agents ... ) before this is heated, the matrix type microparticles containing at least one biocide agent and ensuring, in the presence of moisture or water, a controlled release of said biocide agent or agents. This is how said particles become trapped in the network of cellulose of the finished product.

According to a variant of the process of the invention, said microparticles can be introduced at multiple stages in the preparation of the viscose and of the pulp, and in particular, during the introduction of either the reinforcing fibers, or the pigments or the porophorous agents. Said variant makes it possible to obtain a homogeneous distribution of the particles in the cellulosic product.

According to another variant, in the case of products obtained by coating the pulp on either side of a grid, said microparticles can be deposited either at the level of said grid (on both sides or on only one side thereof), or before on said grid. This particular variant makes it possible to obtain a localized distribution of the particles at the level of the grid. And thus, the particles are virtually invisible to the user.

The following examples are given to illustrate the invention. The microparticles incorporated in the cellular cellulosic materials according to the invention have been prepared in particular by prilling with the following products:

Biocides

Azaconazole = 1-[[2-(2,4-dichlorophenyl)-1,3-dioxalan-2-yl]methyl]-1H-1,2,4-triazole; sold by the company JANSSEN PHARMACEUTICA under the trademark RODEWOOD ®.

Dichlorophene = 2,2'-dihydroxy-5,5'-dichlorodiphenylmethane, sold by the company BAYER under the trademark PREVENTOL GD ®

Carbendazim = methylbenzimidazol-2-yl carbamate (MBC), sold by the company INTACE under the trademark Carbendazim B300 ®

Triclosan = 2,4,4'-trichloro-2'-hydroxybiphenylether; sold by the company CIBA GEIGY under the trademark IRGASAN DP300 ®

Thiabendazole = 2-(1,3-thiazol-4-yl)benzimidazole (TBZ); sold by the company CIBA GEIGY.

Matrix constituents

Stearamide ($C_{17}H_{35}$-$CONH_2$), such as for example UNIWAX ® 1750 sold by UNICHEMA CHEMIE GmbH.

PETROLITE ® PE 1040: oxidized polyethylene wax sold by PETROLITE Co.

POLYWAX ® 2000: straight chain saturated hydrocarbon, sold by PETROLITE Co.

EPOLENE ® C10: polyethylene wax, sold by EASTMAN CHEMICAL PRODUCTS.

UNITHOX ® 550: polyoxyethylenated alcohol, sold by PETROLITE Co.

UNITHOX ® 480: polyoxyethylenated alcohol, sold by PETROLITE Co.

MONTANOX ® 85: surfactant (sorbitane ester), sold by the company SEPPIC.

Said microparticles have a diameter ranging between 500 and 1000 μm.

In order to assess the resistance of the cellular cellulosic materials according to the invention against attacks from micro-organisms, the Applicant has developed the following test, inspired by the norm NF X 41-600.

Said test makes it possible to check the efficiency of the fungicidal treatment. It consists essentially in subjecting the test pieces of cellulosic products to the attack of micro-organisms in a culture receptacle, and in determining, by visual examination and mechanical examination, the degree of development of said micro-organisms, after a predetermined period.

The materials used are as follows:
a Petri dish (of 90 mm diameter),
chloramphenicol Sabouraud's agar,
a ventilated oven including a hatch to let the light through,
a sterilizer,
glassware (Erlenmeyer flask, pipette . . . ),
9 strains of cellulose-lysing fungi: *Memnoniella echinata, Myrothecium vermcaria, Strachybotrys atra, Chaetomium globosum, Penicillium funiculosum, Trichoderma viride, Aspergillus amstelodami, Paecilomyces varioti, Aspergillus niger.*

Said strains were supplied by the French National History Museum—Laboratory of Cryptogamy—Strains Department (12, rue Buffon, 75005 Paris)—They are preserved in a refrigerator and are less than three months' old.

The test is conducted in the following conditions:
Oven temperature: 30° C.
% relative humidity in the oven: 95 %

All the tools, containers and mediums are sterilized beforehand, and any contamination by contact with non-sterilized objects is prevented.

The work is conducted close to the flame of a Bunsen burner and under a hood, to avoid all contamination of the medium.

Test pieces: circular pieces of 5.3 cm diameter and 7 mm maximum thickness are cut from the cellulosic material to be tested.

The method used is as follows:

Preparation of the suspension of spores, at the time of use, with the method consisting in:

Sterilizing for 15 mins. at 120° C., 250 ml of distilled water contained in a 250 ml Erlenmeyer flask.

Pouring 5 ml of the cooled solution in each culture tube. Carefully scraping the surface of the mycelium with the tungsten wire of a sterilized seeding device.

Emptying the contents of each tube into said Erlenmeyer flask through a funnel equipped with a sterile gauze or a filter paper.

Shaking slightly in order to obtain a homogeneous suspension.

Preparation of the culture medium:

The chloramphenicol Sabouraud's gelose is used according to the instructions given on the package.

The gelose, once prepared and sterilized, is then placed in a bath, thermostated at 45° C.

20 ml of the spore solution is dispersed in one liter of gelose at 45° C.

20 ml of the resulting solution are placed, after homogeneization, in each Petri dish.

Said dishes are allowed to stand at room temperature, until the medium has solidified.

Introduction of the test pieces of cellulosic product and carrying out culture process:

A test piece of the cellulosic product is placed in the center of each Petri dish.

A control piece, without fungicide should also be provided.

All the samples should have the same degree of moisture, sterile buffered water being added if necessary.

The Petri dishes are placed in a ventilated oven equipped with a hatch to let the light through (a crystallizer being placed at the bottom of the oven in order to ensure a constant rate of moisture).

Follow-up of the activity of the strains for 3 weeks of culture:

The results of these tests (visual and mechanical) are expressed as indicated hereinafter.

A visual examination of the sample is made after 7, 14 and 21 days spent by said sample in the oven.

The degree of resistance of the samples is noted at each examination, according to the following marking:

0 = no development of fungal growth visible to the naked eye. There can be a circle around the sample to be tested.

1 = the strains are just in contact with the sample, but with nothing developing on the latter 2 = less than 25% of the sample are covered over by the strains.

3 = less than 50% of the sample are covered over by the strains.

4 = less than 75% of the sample are covered over by the strains.

5 = the whole of the sample is covered over by the strains.

The marking of each sample is compared with the marking of the control. After three weeks, mark 3 is acceptable if the controls are marked 5.

A mechanical examination of the sample is made after 21 days spent by said sample in the oven, the mechanical strength of the sample being determined with 2 pairs of tweezers (scraping with said tweezers).

The degree of strength of the samples is noted according to the following marking:

0 = the sample has not lost its initial mechanical strength. Presence of a circle around the sample to be tested.
1 = the sample has not lost its initial mechanical strength.
2 = less than 25% of the sample (on the surface) have lost their initial mechanical strength.
3 = less than 50% of the sample (on the surface) have lost their initial mechanical strength.
4 = less than 75% of the sample (on the surface) have lost their initial strength.
5 = the sample is totally destroyed.

The marking of each sample in compared with the marking of the control. After three weeks, a mark 2 is acceptable if the controls are marked 5.

EXAMPLE 1

(Control (sponge-cloth) without biocide)

A sponge-cloth is produced according to the conventional method.

A mixture of fibrous viscose and sodium sulfate crystals is coated on either side of a grid, and the product thus obtained is regenerated in an acid bath (mixture of sodium sulfate and sulfuric acid), and then rinsed.

The resulting product has the following characteristics:

Thickness: 6 mm
Basis weight (expressed in relation to the weight of dry cellulose): 290 g/m$^2$.

Said product is put through the above-described test. After three weeks, a total destruction of the samples (mark 5) is observed.

EXAMPLE 2

(Non-matrix Control, (sponge-cloth) with biocide)

A sponge-cloth is produced as follows:

1% by weight (with respect to the weight of dry cellulose) of azaconazole is introduced, in solid form, in a mixture of fibrous viscose and sodium sulfate crystals;
this mixture is coated on either side of a grid;
the resulting product is regenerated in an acid bath (mixture of sodium sulfate and sulphuric acid) and then rinsed.

The quantity of biocide eliminated is measured in the regeneration and rinsing baths: 17%.

Then there remains 83% of the biocide initially introduced in the sponge-cloth. Said sponge-cloth has the following characteristics:

Thickness: 6 mm
Basis weight (expressed in relation to the weight of dry cellulose): 290 g/m$^2$.

To simulate a household use, samples of sponge-cloth produced according to the abovedescribed method are put through various washing-machine cycles (washing machines of the type found on the market) (WM) with or without detergent products.

Then they are subjected to the aforedescribed test. The results are as follows:
Visual marking:
 product as is: 1
 product after an WM cycle without detergent: 4–5
 product after an WM cycle with detergent: 5
Mechanical marking:
 product as is: 0
 product after an WM cycle without detergent: 5
 product after an WM cycle with detergent: 5.

No persisting of the treatment is observed. The biocide (azaconazole) is very quickly eliminated when in contact with large quantities of water.

EXAMPLE 3

(Invention: sponge-cloth)

A sponge-cloth is produced as described in Example 1, by spraying, on the surface of the grid, 2% by weight (with respect to the weight of dry cellulose) of microparticles: azaconazole/stearamide (50/50: % by weight), i.e. 1% (with respect to the weight of dry cellulose) by weight of azaconazole.

The quantity of biocide eliminated from the regeneration and rinsing baths is measured: 5%.

Then there remains 95% of the biocide initially introduced in the sponge-cloth. Said cloth has the following characteristics:

Thickness: 6 mm
Basis weight (expressed in relation to the weight of dry cellulose): 200 g/m$^2$.

To simulate a household use, samples of sponge-cloths produced according to the abovedescribed method are put through various washing machine cycles (washing machines of the type found on the market) (WM) without using detergent products.

Then they are put through the above described test. The results are as follows:
Visual marking:
 product as is: 3
 product after one WM cycle without detergent: 2
 Product after five WM cycles without detergent: 3.
Mechanical marking:
 product as is: 1–2
 product after one WM cycle without detergent: 1
 product after five WM cycles without detergent: 1–2.

According to the invention, losses of biocides are reduced during the last stages of the process for producing the sponge-cloth (regeneration-rinsing) and a prolonged efficient action of said biocide is observed

EXAMPLE 4

(Invention: sponge-cloth)

A sponge-cloth is produced as in Example 1, by spraying, on the surface of the grid, 2% by weight (with respect to the weight of dry cellulose) of microparticles: azaconazole/wax PETROLITE®PE 1040-MONTANOX 85 (50/50: % by weight), i.e. 1% by weight (with respect to the weight of dry cellulose) of azaconazole.

The product obtained has the following characteristics:

Thickness: 6 mm
Basis weight (expressed in relation to the weight of dry cellulose): 290 g/m$^2$.

To simulate a household use, samples of sponge-cloth produced according to the abovedescribed method are put through various washing machine cycles (washing machines of the type found in the trade) (WM) without detergent products.

Then they are put through the abovedescribed test. The results are as follows:
Visual marking:
  product as is: 2-3
  product after once WM cycle without detergent: 2-3
  product after five WM cycles without detergent: 3.
Mechanical marking:
  product as is: 1
  product after one WM cycle without detergent: 1
  product after five WM cycles without detergent: 1-2.

Said samples are found to be particularly strong.

EXAMPLE 5

(Invention: sponge-cloth)

A sponge-cloth is produced as described in Example 1, by spraying, on the surface of the grid, 2% by weight (with respect to the weight of dry cellulose) of microparticles: carbendazim/stearamide (50/50: % by weight); i.e. 1% by weight (with respect to the weight of dry cellulose) of carbendazim.

The resulting product has the following characteristics:
  Thickness: 6 mm
  Basis weight (expressed in relation to the weight of dry cellulose): 290 g/m$^2$.

To simulate a household use, samples of sponge-cloth produced according to the abovedescribed method are put through various washing machine cycles (washing machines of the type found on the market) (WM) without detergent products.

Then they are put through the abovedescribed test. The following results are obtained:
Visual marking:
  product as is: 5
  product after one WM cycle without detergent: 2
  product after five WM cycles without detergent: 2-3.
Mechanical marking:
  product as is: 5
  product after one WM cycle without detergent: 1
  product after five WM cycles without detergent: 2.

This system is only found to be efficient in use, after one wash, this permitting solubilization of part of the active ingredient.

EXAMPLE 6

(Control (sponge) without biocide)

A sponge is produced according to the conventional method (viscose process).

A mixture of fibrous viscose and sodium sulfate crystals is molded, and the resulting product is regenerated in a basic bath (mixture of sodium sulfate and soda), then it is removed from the mold, and rinsed abundantly.

The product obtained has the following characteristics:
  Cross-section (in dry state): 80-60 mm.
  Density (ratio of the weight of the dried sponge to the volume of the wet sponge after centrifuging at 3000 rpm for 2 mins.): 0.03.

This product is then put through the abovedescribed test. After three weeks, a total destruction of the samples is observed.

EXAMPLE 7

(Invention: sponge)

A sponge is produced as described in Example 6, by mixing 6.66% by weight (with respect to the weight of the dry cellulose) of microparticles: carbendazim/POLYWAX ®2000wax (30/70: % by weight); i.e. 2% by weight (with respect to the weight of dry cellulose) of carbendazim.

The product obtained has the following characteristics:
  Cross-section (in dry state): 80-60 mm.
  Density (ratio of the weight of the dried sponge to the volume of the weight sponge after centrifuging at 3000 rpm for 2 mins.): 0.03.

Sample of this product are then put through the abovedescribed test. The results are as follows:
Visual marking:
  product as is: 2-3
  product after one WM cyle without detergent: 2.
Mechanical marking:
  product as is: 1-2
  product after one WM cycle without detergent: 2.

The product according to the invention is well protected.

The present invention has been described with reference to the technical problem of incorporation of biocide or biocides into cellular cellulosic materials. It is easily conceivable that the incorporation for a similar purpose of another active ingredient is also within the scope of the present invention.

Said invention therefore relates to a cellular cellulosic material which contains in its cellulose network, matric type microparticles; said microparticles containing an active ingredient and releasing it in controlled manner.

What is claimed is:

1. A cellular cellulosic material containing matrix microparticles of an antibacterial and/or antifungal biocide agent or a mixture of antibacterial and/or antifungal biocide agents distributed throughout the cellulosic material, wherein the biocide agent or a mixture of biocide agents is controllably released in the presence of water.

2. A cellular cellulosic material as claimed in claim 1 wherein the matrix particles are in the form of spheres having a diameter ranging between 0.05 and 2 mm.

3. A cellular cellulosic material as claimed in claim 2 wherein the spheres have a diameter of between 0.1 and 1 mm.

4. A cellular cellulosic material as claimed in claim 1 wherein the matrix microparticles are in the form of flakes.

5. A cellular cellulosic material as claimed in claim 1 wherein said material comprises between 0.1 and 10% by weight with respect to the weight of dry cellulose of said matrix microparticles.

6. A cellular cellulosic material as claimed in claim 5 wherein said material comprises between 0.5 and 2% by weight of said microparticles.

7. A cellular cellulosic material as claimed in claim 1 wherein the biocide agent is selected from the group consisting of:
  2-(1,3-thiazol-4-yl)benzimidazole;
  methylbenzimidazole-2-yl carbamate;
  2,2'-dihydroxy-5,5'-dichlorodiphenylmethane;
  2,4,4'-trichloro-2'-hydroxybiphenylether;

1-[[2-(2,4-dichlorophenyl)-1,3-dioxolan-2-yl]-methyl]-1H-1,2,3-triazole;

and mixtures thereof;

and wherein the matrix microparticles comprise a hydrophobic constituent which is meltable at a temperature above 100° C., wherein the hydrophobic constituent is selected from the group consisting of:

microcrystalline waxes;

straight chain saturated hydrocarbons of molecular weight ranging between 500 and 3000;

polyethylene waxes of molecular weight ranging between 500 and 3000;

straight chain fatty acid amides;

bistearamide ethylene;

and mixtures thereof.

8. A cellular cellulosic material as claimed in claim 7 wherein the straight chain fatty acid amide is stearamide.

9. A cellular cellulosic material as claimed in claim 1, wherein said microparticles comprise between 5 and 70% by weight of biocide agent or a mixture of biocide agents.

10. A cellular cellulosic material as claimed in claim 9, wherein said microparticles comprise between 15 and 50% by weight of biocide agent or a mixture of biocide agents.

11. A process for the preparation of a cellular cellulosic material as claimed in claim 1, comprising the steps of:

preparing a pulp from a mixture of a cellulosic solution, fibrous materials, pigments and porophorous agents;

shaping said pulp;

adding matrix microparticles comprising a biocide agent or a mixture of biocide agents to the pulp such that the microparticles are distributed throughout the pulp;

heating the pulp, optionally in a suitable medium, to activate said porophorous agents; and regenerating the cellulose.

12. A process as claimed in claim 11 wherein the cellulosic solution is viscose.

13. A process as claimed in claim 11 wherein the pulp is shaped by molding, by coating on one or both sides of a grid, or by depositing the pulp on a conveyor belt.

14. A process as claimed in claim 13 wherein the pulp is shaped by coating on one or both sides of a grid and wherein the microparticles are deposited on one or both sides of said grid before or during the coating step.

15. A cellular cellulosic material as claimed in claim 1 which is sponge, sponge-cloth, foamed sponge, a cleaning cloth or a cleaning tool.

16. A cellular cellulosic material as claimed in claim 1 wherein the biocide agent or mixture of biocide agents has low solubility in water, is active at low concentrations, and is solid at room temperature.

17. A process as claimed in claim 11 wherein the cellulose is regenerated by acid regeneration.

18. A process as claimed in claim 11 wherein the cellulose is regenerated by basic regeneration.

19. A process as claimed in claim 11 wherein the cellulose is regenerated by pasing an a.c. current between electrodes in contact with the pulp.

* * * * *